United States Patent [19]

Nagahara et al.

[11] Patent Number: 4,557,109
[45] Date of Patent: Dec. 10, 1985

[54] BRAKE FOR A HYDRAULIC MOTOR

[75] Inventors: Yoshikazu Nagahara; Nobuaki Inaba, both of Yokohama, Japan

[73] Assignee: Kabushiki Kaisha Komatsu Seisakusho, Tokyo, Japan

[21] Appl. No.: 516,361

[22] Filed: Jul. 22, 1983

[51] Int. Cl.⁴ .............................................. F16D 31/02
[52] U.S. Cl. ............................................ 60/436; 91/45
[58] Field of Search ................. 60/435, 436, 442, 441; 188/170; 92/24, 27, 28; 91/41, 44, 45, 416, 394, 401, 409, 408, 392; 192/3 R, 3 N

[56] References Cited

U.S. PATENT DOCUMENTS

| | | | |
|---|---|---|---|
| 2,670,828 | 3/1954 | McFarland | 91/52 X |
| 3,118,520 | 1/1964 | Tjernstrom | 188/170 |
| 3,536,230 | 10/1970 | Williams | 192/3 N |
| 3,831,718 | 8/1974 | Muller et al. | 188/170 |
| 3,917,248 | 11/1975 | Mayer | 91/416 X |
| 4,479,506 | 10/1984 | Goans | 91/394 X |

FOREIGN PATENT DOCUMENTS 37-25441 2/1962 Japan .
52-70291 5/1977 Japan .

Primary Examiner—Edward K. Look
Attorney, Agent, or Firm—Armstrong, Nikaido, Marmelstein & Kubovcik

[57] ABSTRACT

A spring applied and hydraulically released motor shaft brake apparatus for a hydraulic motor which is compact in size. The brake apparatus includes a piston slidably mounted in a cylinder defining a brake chamber and a drain chamber. The piston is slidably and rotatably mounted on the motor shaft and a spring is disposed in the drain chamber for biasing the piston towards the brake chamber to thereby lock the motor shaft against rotation. The brake chamber is selectively connectible with a pressurized fluid source while the drain chamber is connected with a drain. The piston has formed therein a passage with a restrictor disposed therein for restricting flow of fluid in the passage.

2 Claims, 1 Drawing Figure

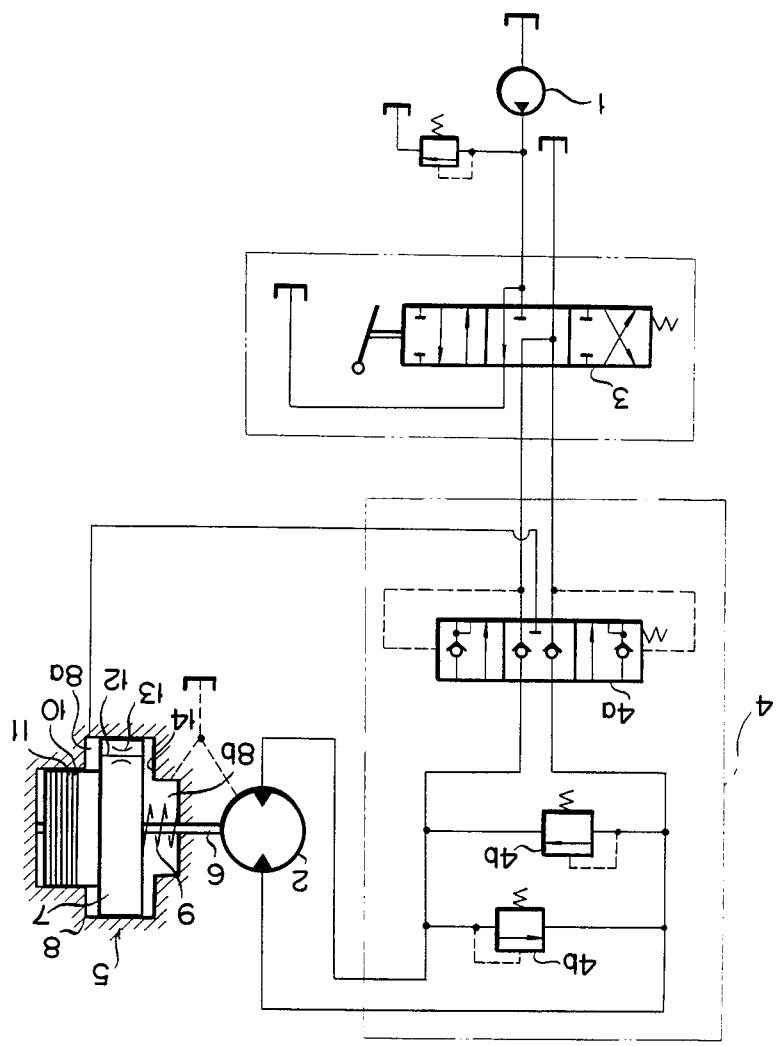

BRAKE FOR A HYDRAULIC MOTOR

BACKGROUND OF THE INVENTION

This invention relates to a brake apparatus mounted on a hydraulic motor so as to apply a brake force on the motor shaft.

The brake apparatus of the kind specified has been adapted to apply the hydraulic pressure introduced from the high pressure side of a conduit connected to the hydraulic motor on a brake piston thereby to release the shaft brake against the biasing force of a spring. When applying the brake, a control valve for controlling the hydraulic motor is shifted to the neutral position and the hydraulic fluid in a brake chamber is drained when a counterbalancing valve is returned to its neutral position thereby enabling a brake effect to be exerted by the force of the spring.

Such a construction has been disadvantageous in that it requires the provision of a shuttle valve between the counterbalancing valve and the brake apparatus adapted to supply fluid under a high pressure into the brake chamber when the brake is released and drain the high pressure fluid within the brake chamber when the brake is actuated. When using such a shuttle valve, the counterbalancing valve is required to be connected with a drain circuit for draining the brake chamber thereby increasing the manufacturing cost thereof.

SUMMARY OF THE INVENTION

It is therefore an object of the present invention to provide a brake apparatus for braking an output shaft of a hydraulic motor which is compact in size and inexpensive to produce.

In accordance with an aspect of the present invention, there is provided a brake apparatus for braking an output shaft of a hydraulic motor, comprising: a cylinder; a piston slidably mounted in said cylinder defining with said cylinder a first and a second chamber, said piston being slidably and rotatably mounted on said output shaft, said first chamber being selectively communicated with a pressurized fluid source and said second chamber being communicated with a drain; spring means for biasing said piston towards said first chamber; means for locking said output shaft against rotation when biased by said spring means; a passage formed in said piston for communicating said first chamber with said second chamber; and a restrictor formed in said passage for restricting flow of fluid in said passage.

The above and other objects, features and advantages of the present invention will be readily apparent from the following description taken in conjunction with the accompanying drawing.

BRIEF DESCRIPTION OF THE DRAWING

The sole FIGURE diagrammatically shows a hydraulic circuit incorporating a brake apparatus according to the invention.

DESCRIPTION OF THE PREFERRED EMBODIMENT

The present invention will now be described below by way of example only with reference to the accompanying drawing.

In the drawing, reference numeral 1 denotes a hydraulic pump, 2 a hydraulic motor and 3 a control valve. Reference numeral 4 denotes a brake valve interposed between the hydraulic motor 2 and the control valve 3 and which comprises a counterbalancing valve 4a and cross-over relief valves 4b, 4b. Reference numeral 5 indicates a brake apparatus mounted on an output shaft 6 of the hydraulic motor 2. This brake apparatus comprises a piston 7 slidably and rotatably mounted on the output shaft 6, a cylinder 8 in which the piston 7 is fitted, a spring 9 adapted to return the piston 7, a plurality of disks 10 fixedly mounted on the output shaft 6 and a plurality of plates 11 fixedly secured to the cylinder 8. The arrangement is made such that when the fluid under pressure is supplied into the brake chamber 8a the piston 7 is moved leftwards against the biasing force of the spring 9 so as to release the brake and when the fluid under pressure within the brake chamber 8a is drained the spring 9 will urge the piston 7 rightwards to actuate the brake.

Formed in the piston 7 is a bypass passage 12 which connects the brake chamber 8a with a drain chamber 8b located on the opposite side thereof and in which a restrictor 13 is interposed. Further, the drain chamber 8b has a closure wall 14 formed therein and against which the piston 7 is allowed to abut when it is moved leftwards against the bias of the spring. The brake chamber 8a is connected with the counterbalancing valve 4a. The brake chamber 8a is connected with the pump circuit when the counterbalancing valve 4a occupies its forward running and reversing positions and it is disconnected from the pump circuit when the counterbalancing valve 4a is located at its neutral position.

Thus, when the control valve 3 is operated to supply the fluid under pressure delivered by the hydraulic pump 1 into the hydraulic motor 2 to thereby rotate the latter forwardly or reversely, part of the fluid under pressure is supplied through the counterbalancing valve 4a into the brake chamber 8a of the brake apparatus 5. As a result, a differential pressure is created when the fluid under pressure flows from the brake chamber 8a through the restrictor 13 formed in the piston 7 into the drain chamber 8b, the differential pressure serving to move the piston 7 to the left against the bias of the spring thereby to release the brake effect. When the piston 7 reaches its stroke end so that the bypass passage 12 may be blocked by the closure wall 14, the fluid under high pressure applied to the hydraulic motor 2 will be directly exerted into the brake chamber 8a.

When the control valve 3 is shifted from the above condition to the neutral position, the counterbalancing valve 4a will occupy its neutral position as well to thereby stop the hydraulic motor 2. Thus, the supply of the fluid under pressure into the brake chamber 8a is interrupted. As a result, the piston 7 is returned by the biasing force of the spring 9 to engage the disks 10 with the plates 11 to thereby apply the brake force. At that time, the fluid under pressure within the brake chamber 8a is discharged through the bypass passage 12 into the drain chamber 8b.

As described in detail hereinabove, according to the present invention, the arrangement can be made without using a shuttle valve and without having to connect a drain circuit for draining the fluid within the brake chamber 8a with the counter-balancing valve 4a so that a compact and cheap brake apparatus can be obtained.

It is to be understood that the foregoing description is merely illustrative of a preferred embodiment and the invention is not to be limited thereto, but is to be determined by the scope of the appended claims.

What is claimed is:

1. A brake apparatus in combination with a hydraulic moter having a rotatable output shaft, said apparatus comprising:
   a cylinder;
   a piston slidably mounted in said cylinder defining with said cylinder a first and a second chamber, said piston being slidably and rotatably mounted on the output shaft, said first chamber being selectively communicated with a pressurized fluid source and said second chamber being communicated with a drain;
   spring means for biasing said piston towards said first chamber;
   means for locking the output shaft against rotation when biased by said spring means;
   a passage formed in said piston for communicating said first chamber with said second chamber;
   a restrictor formed in said passage for restricting flow of fluid in said passage; and
   a closure wall formed integral with the cylinder wall for closing said passage when said piston is hydraulically biased towards said second chamber against the bias of said spring means.

2. A brake apparatus according to claim 1 wherein said locking means comprises a plurality of disks fixedly secured to said output shaft and a plurality of plates fixedly secured to said cylinder, said disks and said plates being alternately arranged.

* * * * *